United States Patent
Kinkade

(10) Patent No.: US 12,197,650 B2
(45) Date of Patent: Jan. 14, 2025

(54) SYSTEMS AND METHODS FOR GENERATING PRECISE HAPTIC FEEDBACK FROM POINT CLOUD DATA POINTS

(71) Applicant: Illuscio, Inc., Culver City, CA (US)

(72) Inventor: Kyle Kinkade, Mountlake Terrace, WA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/183,772

(22) Filed: Mar. 14, 2023

(65) Prior Publication Data

US 2024/0310916 A1   Sep. 19, 2024

(51) Int. Cl.
*G06F 3/01*   (2006.01)

(52) U.S. Cl.
CPC .................................. *G06F 3/016* (2013.01)

(58) Field of Classification Search
CPC ...................................................... G06F 3/016
See application file for complete search history.

(56) References Cited

U.S. PATENT DOCUMENTS

| | | | |
|---|---|---|---|
| 2010/0231508 A1* | 9/2010 | Cruz-Hernandez | G06F 1/1643 715/702 |
| 2018/0004290 A1* | 1/2018 | Shtraym | G06F 3/016 |
| 2018/0161671 A1* | 6/2018 | Heubel | A63F 13/212 |
| 2021/0117002 A1* | 4/2021 | Eagleman | G06F 3/011 |

FOREIGN PATENT DOCUMENTS

| | | | | |
|---|---|---|---|---|
| CN | 101809526 A | * | 8/2010 | G06F 3/016 |
| WO | WO-2017211740 A1 | * | 12/2017 | G06F 3/016 |

OTHER PUBLICATIONS

Alexey et al., Optimization of data acquisition algorithm for temperature and emissivity distribution measurement using snapshot hyperspectral imaging systems, Aug. 2021, Case Studies in Thermal Engineering, vol. 26, 101154 (Year: 2021).*

* cited by examiner

*Primary Examiner* — Stacy Khoo
(74) *Attorney, Agent, or Firm* — Ansari Katiraei LLP; Arman Katiraei; Sadiq Ansari

(57) ABSTRACT

A three-dimensional ("3D") interactive system uses the positional data of the point cloud points to identify exactly where user input contacts part of a 3D object represented by the point cloud points, and to generate precise haptic feedback based on the haptic characteristics of the contacted points. Specifically, the system determines that coordinates of the user input match or are within a threshold distance of a particular data point from a set of data points that form the 3D object. The system retrieves the haptic characteristics of the particular data point, and generates the haptic response on a haptic input device based on the haptic characteristics of the particular data point.

18 Claims, 7 Drawing Sheets

SYSTEMS AND METHODS FOR GENERATING PRECISE HAPTIC FEEDBACK FROM POINT CLOUD DATA POINTS

BACKGROUND

Three-dimensional ("3D") objects defined as connected sets of meshes or polygons become interactive with the separate definition of a collider for each 3D object. The collider is linked to the 3D object and has its own structure or form from which to determine when and where the 3D object is contacted by a force or input.

A simple collider is a bounding box that is defined over and around the 3D object or part of the 3D object. A complex collider is a mesh collider that mirrors the form of the 3D object.

In any case, the primary function of the collider is to indicate when a force or input makes contact with any part of the collider. The collider does not identify the exact position about the 3D object where the contact is made.

Moreover, the definition of the collider for a 3D object being separate from the connected sets of meshes that define the structure of the 3D object creates additional complexity for interacting with the 3D object. Specifically, the separate definition of the collider and the uniform output produced across the collider prevents the integration of complicated physics and/or complex haptic feedback for when a soft, elastic, or compressible part of the 3D object is contacted versus a hard, rigid, or uncompressible part of the 3D object is contacted.

DETAILED DESCRIPTION OF PREFERRED EMBODIMENTS

The following detailed description refers to the accompanying drawings. The same reference numbers in different drawings may identify the same or similar elements.

Provided are systems and methods for generating precise haptic feedback from the data contained directly within the points of a point cloud. Specifically, a three-dimensional ("3D") interactive system uses the positional data of the point cloud points, without the definition of a separate collider, to not only detect when user input collides or contacts a 3D object represented by the point cloud points, but to also identify the exact point of contact about the 3D object based on the individual point cloud points that the user input contacts. The 3D interactive system generates the precise haptic feedback at a position in a physical space that corresponds to the positions of the contacted points in the virtual space of the point cloud. Moreover, the intensity and sensation reproduced by the precise haptic feedback is adjusted based on different haptic characteristics that are defined or associated with each of the contacted points. For instance, the haptic feedback may be provided with a greater non-uniform force when the contacted points are associated with a hard, rigid, hot, cold, or other first set of haptic characteristics, and with a lesser uniform force when the contacted points are associated with soft, elastic, temperate, or other second set of haptic characteristics.

As each point cloud point becomes its own collider, the 3D interactive system provides more accurate collision detection than separately defined colliders for 3D objects, and further provides precise and realistic haptic feedback for human interface purposes and/or applications that require precise human interaction. For instance, the 3D interactive system enables simulated or remote surgical operations via the adapted use of the point cloud points for exact collision detection and point-specific feedback.

Figure 1:
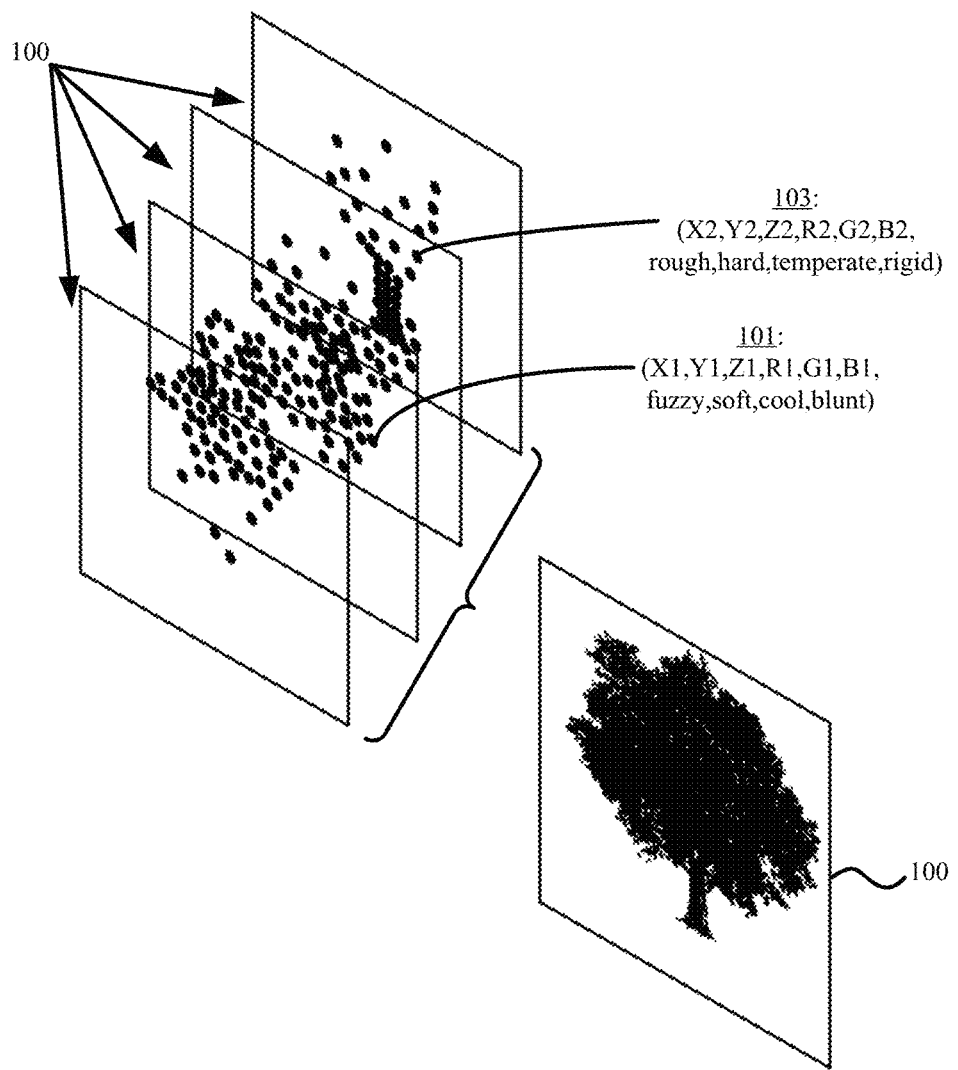
FIG. 1 illustrates an example point cloud with data points for generating precise haptic feedback based on detected collisions with individual data points in accordance with some embodiments presented herein.

FIG. 1 illustrates an example point cloud 100 with data points for generating precise haptic feedback based on detected collisions with individual data points in accordance with some embodiments presented herein. Point cloud 100 includes data points that are non-uniformly defined or distributed across a virtual 3D space.

The data points of point cloud 100 differ from pixels of a two-dimensional ("2D") image, because certain regions of point cloud 100 have no data points, lower densities of data points, and/or higher densities of data points based on varying amounts of visual information that is detected, scanned, or created at those regions. Additionally, the positions of the point cloud data points are defined in a 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image have pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements.

The positional elements include coordinates within a 3D space. For instance, each point cloud data point includes x-coordinate, y-coordinate, and z-coordinate elements that capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point. In some embodiments, the positional elements may be defined for created data points and may be measured with a scanner for scanned surfaces, features, or objects.

The 3D interactive system performs the precise collision detection and haptic feedback based on the positional elements of the data points. For instance, the 3D interactive system maps a user input to the 3D space of point cloud 100, and determines which data points are contacted by that user input. The 3D interactive system then provides a haptic response at a corresponding position in the physical space that maps to the contacted points in the 3D space of point cloud 100.

The non-positional elements include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point. These hyperspectral values may associate temperature to the individual data points, and the 3D interactive system may translate the temperatures and/or the associated hyperspectral values to different haptic characteristics of the data point.

In some embodiments, the non-positional elements store other haptic characteristics including the hardness, softness, elasticity, texture (e.g., roughness or smoothness), spring force, stickiness, and/or other sensory characteristics associated with touching the point about the surface, feature, or object that is represented by the data point. The haptic characteristics may be automatically derived by analyzing the relative positioning, color values, and/or other descriptive characteristics of neighboring data points. For instance, neighboring data points that are positioned about a common plane may represent a smooth surface, whereas neighboring data points that are about the same x and y plane but differing z planes may represent a rough surface. In some embodiments, the haptic characteristics are defined by rendering the point cloud data points, performing object recognition on the objects formed by the rendered data points, and attributing the haptic characteristics that are associated with the recognized object. For instance, the 3D interactive system attributes rough and rigid haptic characteristics to a first set of data points that form a wooden table, and attributes smooth and soft haptic characteristics to a second set of data points that form a pillow. The haptic characteristics may also be defined when generating the point cloud model of an object. For instance, when scanning a tennis ball to generate a point cloud representation of the tennis ball, the scanner may be configured with haptic characteristics of fuzzy, bouncy, grooved, and hollow.

In some embodiments, the non-positional elements directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic". Each of the material properties may be associated with one or more haptic characteristics.

FIG. 1 illustrates first data point 101 that represents part of a tree leaf, and second data point 103 that represents part of a tree branch. The positional elements of first data point 101 specify the position in the 3D space of point cloud 100 for the tree leaf part represented by first data point 101 relative to other data points representing other parts of the tree, and the position at which user input contacts first data point 101. The non-positional elements of first data point 101 define the color values of the tree leaf part as well as the fuzzy, soft, cool, and blunt haptic characteristics associated with that tree leaf part. The positional elements of second data point 103 specify the position in the 3D space of point cloud 100 for the tree branch part represented by second data point 103 relative to other data points representing other parts of the tree, and the position at which user input contacts second data point 103. The non-positional elements of second data point 103 define the color values of the tree branch part as well as the rough, hard, temperate, and rigid haptic characteristics associated with that tree branch part.

In some embodiments, the 3D interactive system associates the different haptic characteristics with different haptic responses or feedback. Accordingly, the haptic response associated with touching or contacting a particular data point may be adjusted by adjusting one or more of the non-positional elements that represent the haptic characteristics of the particular data point. For instance, adjusting the haptic response associated with a data point representing a hot surface may include adjusting the infrared hyperspectral values stored in one or more non-positional elements of the data point. Similarly, adjusting the haptic response so that a contacted data point feels soft rather than rough includes changing the value defined for the non-positional element of the contacted data point that represents the hardness or softness haptic characteristic.

In some embodiments, the 3D interactive system uses the haptic characteristics of the data points as the basis for adjusting the positioning or displacement of the data points in response to applied force or input. In doing so, the 3D interactive system creates complex animated physics in which the movement or displacement of each data point forming a larger 3D object is defined based on the haptic characteristics of that data point and the application of a force or user input on that data point. If the haptic characteristics of the data point indicate that the data point represents a rigid or heavy material, then the displacement caused by a contacting force or user input is less than if the haptic characteristics of the data point indicate that the data point represents a flexible or light material.

Accordingly, each point cloud data point or 3D construct of the point cloud includes an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, hyperspectral values measured in the infrared bands that correspond to temperature, and/or various haptic characteristics associated with the feel of the surface, feature, or object represented by that data point.

Figure 2:
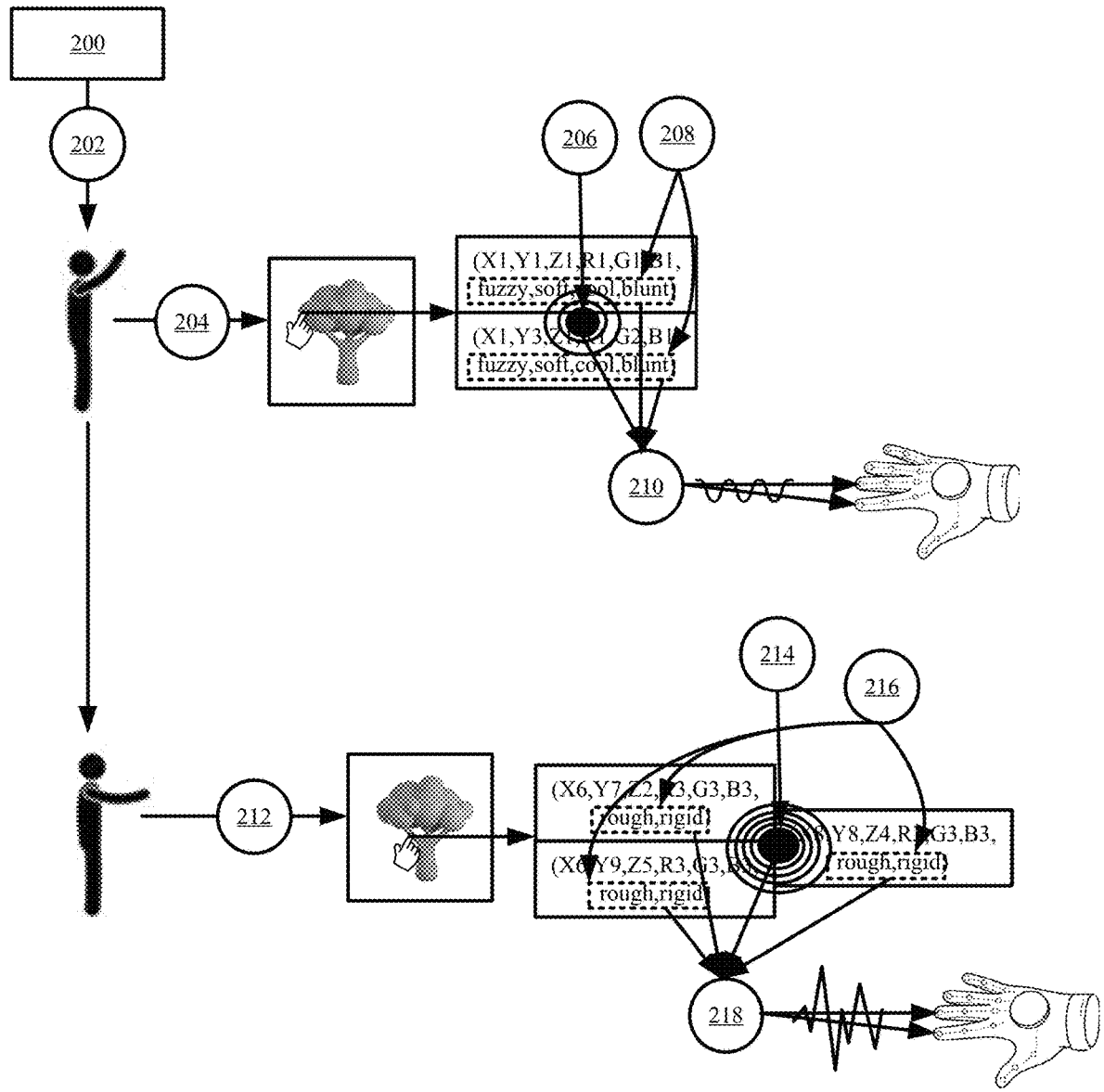
FIG. 2 illustrates an example of providing precise haptic feedback based on integrated colliders in the point cloud data point positional elements and integrated haptic characteristics in the point cloud data point non-positional elements in accordance with some embodiments presented herein.

FIG. 2 illustrates an example of providing precise haptic feedback based on integrated colliders in the point cloud data point positional elements and integrated haptic characteristics in the point cloud data point non-positional elements in accordance with some embodiments presented herein. 3D interactive system 200 receives (at 202) user input for interacting with 3D objects created in a virtual space of a point cloud. The form of the 3D objects are defined by the positional data of the point cloud data points, and the coloring and/or other visual characteristics of the 3D objects are defined by the non-positional data of the point cloud data points.

The user input may be used to control a virtual character in the virtual space and to interact with the 3D objects. Alternatively, the user input may include hand gestures, 3D controller inputs, and/or other inputs performed in a physical space that are mapped to the virtual space and that are used to interact with the 3D objects.

3D interactive system 200 detects (at 204) first user input that contacts, intersects, touches, collides, or otherwise applies to part of a 3D object that is generated from a first set of data points. Specifically, 3D interactive system 200 continuously compares the coordinates of the first user input in the 3D space of the point cloud against the positional elements of the point cloud data points, and determines that the first user input contacts the first set of data points when the first user input coordinates match or are within a threshold distance of the positional elements defined for the first set of data points.

3D interactive system 200 measures (at 206) the force, pressure, direction, and/or movement with which the first user input is applied to the first set of data points. In some embodiments, 3D interactive system 200 measures (at 206) the force and/or pressure based on one or more of an amount of time the first user input remains on or in contact with the first set of data points, and a distance that the first user input moves past, through, or into the position of the first set of data points. Measuring (at 206) the movement includes tracking the pattern of contact created by the first user input in order to differentiate between a rubbing motion, a hard press, a soft press, a tap, a slide, and/or other differentiable movements between the first user input and the first set of data points.

3D interactive system 200 determines (at 208) the haptic characteristics of the first set of data points. For instance, 3D interactive system 200 retrieves the one or more non-positional values of the first set of data points that store the haptic characteristics of the first set of data points.

3D interactive system 200 generates (at 210) a first precise haptic feedback based on the force, pressure, direction, movement, and/or other application of the first user input to the first set of data points and the haptic characteristics of the first set of data points. For instance, the first set of data points represent leaves with soft and light haptic characteristics. Accordingly, 3D interactive system 200 generates (at 210) the first precise haptic feedback to provide little resistance against the first user input and a low intensity uniform or consistent feedback during the first user input to simulate the smooth surfaces of the represented leaves. The first precise haptic feedback is provided so long as the first user input contacts the first set of data points.

3D interactive system 200 detects (at 212) second user input that contacts, intersects, touches, collides, or otherwise applies to part of a different 3D object that is generated from a second set of data points. 3D interactive system 200 measures (at 214) the force, pressure, and/or movement with which the second user input is applied to the second set of data points based on the amount of time the second user input remains on or in contact with the second set of data points and/or a distance that the second user input moves past, through, or into the position of the second set of data points.

3D interactive system 200 determines (at 216) the haptic characteristics of the second set of data points. The second set of data points represent a wooden branch, and are therefore defined with rigid and rough haptic characteristics.

3D interactive system 200 generates (at 218) a second precise haptic feedback based on the force, pressure, direction, movement, and/or other application of the second user input to the second set of data points and the different haptic characteristics of the second set of data points. The second precise haptic feedback provides greater resistance against the second user input than the resistance provided against the second user input and a higher intensity non-uniform or inconsistent feedback during the second user input to simulate the rigid and rough surfaces of the wooden branch.

3D interactive system 200 generates (at 210 and 218) the first and second precise haptic feedback by referencing only the data stored in the data points of the point cloud that were contacted by the different user input and without defining or creating separate colliders for 3D objects created by the contacted data points. Accordingly, no additional data or colliders are defined for the point cloud in order to generate the haptic feedback or to perform the collision detection.

Moreover, 3D interactive system 200 generates (at 210 and 218) different haptic responses based on the different haptic characteristics that are defined for the data points representing the different contacted 3D objects. The point cloud data points, unlike separately defined colliders for entire 3D objects, provide 3D interactive system 200 with exact positional information for what part of a 3D object is contacted, and the specific haptic characteristics for that contacted part of the 3D object. 3D interactive system 200 adjusts the haptic response that is returned to the user based on the changing haptic characteristics of the contacted data points.

Figure 3:
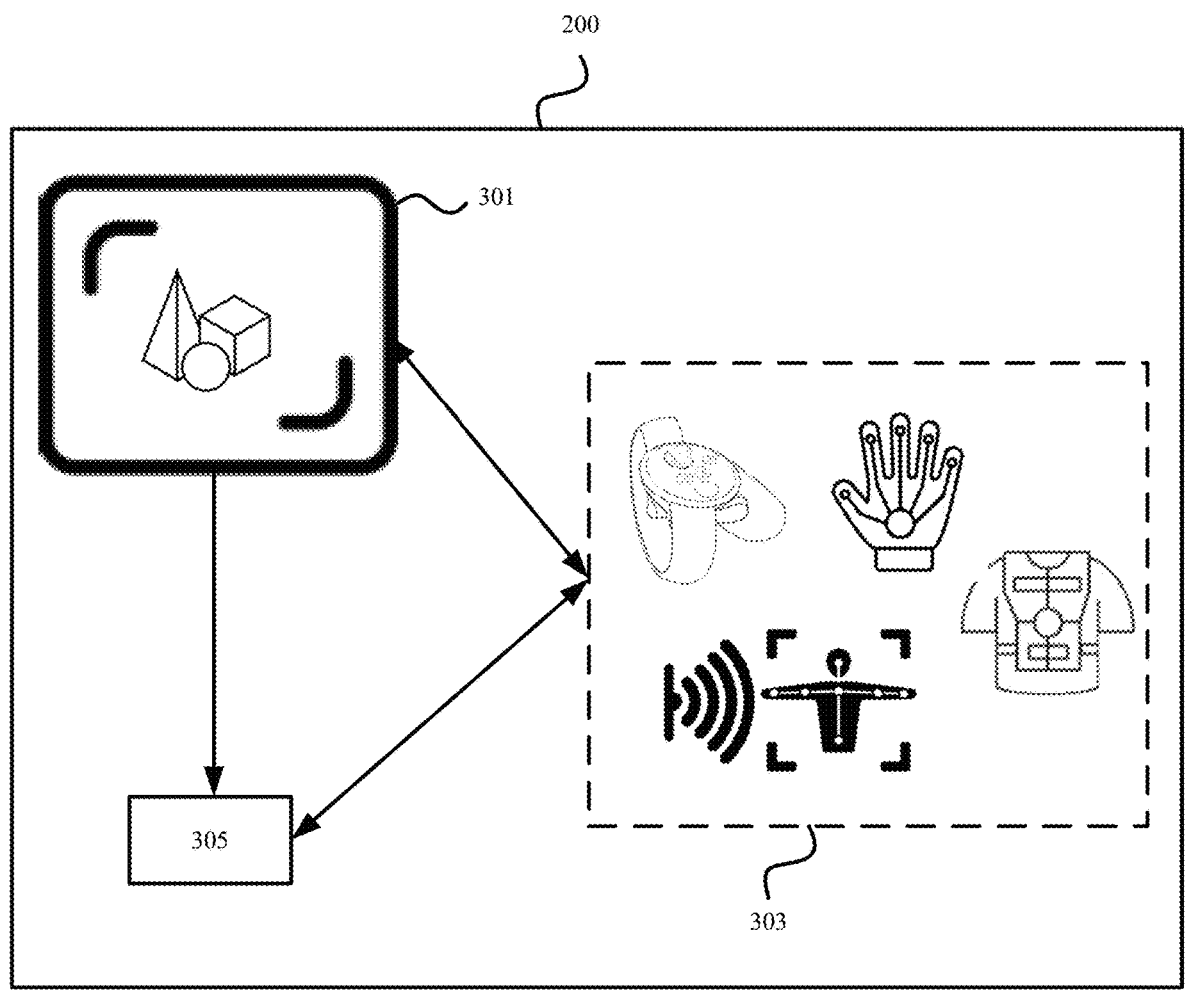
FIG. 3 illustrates an example architecture and/or components of a three-dimensional ("3D") interactive system in accordance with some embodiments presented herein.

FIG. 3 illustrates an example architecture and/or components of 3D interactive system 200 in accordance with some embodiments presented herein. 3D interactive system 200 includes user interface ("UI") 301, input device 303, and haptic controller 305.

UI 301, input device 303, haptic controller 305, and/or other components of 3D interactive system 200 execute on one or more devices or machines with processor, memory, storage, network, and/or other hardware resources. The one or more devices or machines may include virtual reality, mixed reality, augmented reality, or other spatial computing headsets or wearable devices, or may include computing devices that are used to generate 3D scenes or environments for games, 3D images, videos, and/or other interactive or multimedia content in a detached display.

UI 301 presents the 3D objects that are generated from rendering the point cloud data points or other 3D image data. In some embodiments, each 3D object presented in UI 301 is generated from a different point cloud. In some other embodiments, a single point cloud includes different sets of data points for generating two or more 3D objects in UI 301.

UI 301 presents the 3D objects in an interactive virtual space or environment. Specifically, UI 301 accepts user input from input device 303 for interacting with the 3D objects and for synchronizing the interactions with haptic feedback that is returned to input device 303 from haptic controller 305.

Input device 303 provides 3D inputs to 3D interactive system 200. The 3D inputs include x, y, and z coordinates that are performed using sticks, controllers, and/or tracked movements. The 3D inputs may be performed in a physical space and mapped to coordinates in the virtual space of UI 301. Alternatively, the 3D inputs may be directly input to the virtual space of UI 301 when the 3D inputs are used to control movements of a character or other 3D object in UI 301.

In some embodiments, input device 303 includes sensors that track user hand and finger movements, and that provide the tracked movements as separate input to UI 301, haptic controller 305, and/or other components of 3D interactive system 200 that render the 3D objects and interact with the 3D objects in response to the user inputs. For instance, the one or more sensors track the position and movement of the user hand in physical space as well as the movement of individual fingers.

In some embodiments, input device 303 includes accelerometers, gyroscopes, magnetometers, and other motion sensors to track device movements and to generate the 3D inputs. Additionally, input device 303 may include light sensors, cameras, buttons, or triggers to generate additional or specific inputs such as finger movements.

Input device 303 may be a glove or other device that is worn over the user hand with sensors to track hand movements and individual finger movements. Alternatively, input device 303 may be a controller that is held in the user hand. In some embodiments, input device 303 further includes a body suit, vest, head covering, and/or other wearable device that provides haptic feedback across the user body for different points-of-contact between the tracked positioning of the user body and the positioning of the point cloud data points.

Input device 303 also includes haptic feedback servomotors and/or actuators. The servomotors and/or actuators produce configurable vibrations, movements, forces, temperature, and/or physical sensations that simulate different textures, surfaces, degrees of sharpness, and/or material properties, and that counter finger and/or hand movements of the user in configurable directions with configurable amounts of force to replicate the physics of interacting with objects of different sizes, weights, thicknesses, softness, and/or other material properties. In some embodiments, one or more servomotors and/or actuators are located next to the sensors that produce the different user input for different finger movements. In this configuration, input device 303 may activate the servomotors for the finger that is determined to touch a 3D object in the virtual space based on the input generated from the sensor associated with that finger.

Haptic controller 305 may be integrated in input device 303 or may reside apart from input device 303 as part of the one or more devices that generate and manipulate UI 301 in response to user input from input device 303. Haptic controller 305 monitors the user input to detect contact or collisions with the point cloud data points. Specifically, haptic controller 305 compares the user input coordinates against the positional elements of the point cloud data points in order to determine when the user input contacts one or more data points. Haptic controller 305 then generates the haptic response to the haptic feedback servomotors and/or actuators of input device 303 based on the haptic characteristics associated with the contacted data points.

Haptic controller 305 controls the haptic response via electronical signals that activate individual servomotors and/or actuators in a specific direction, with a specific strength or force, and/or with a desired output. For instance, to differentiate between touching of a rigid surface and an elastic or soft surface, haptic controller 305 regulates the resistance or the amount of force that the servomotors provide in a first direction that is opposite to a second direction of the user input. Specifically, haptic controller 305 produces slow and uniform feedback to simulate touching of a smooth surface and fast and non-uniform feedback to simulate touching of a rough surface. To simulate temperature, haptic controller 305 sends electrical pulses to the servomotors that cause the servomotors to vibrate, heat up, and/or jolt. In some embodiments, the servomotors include heating elements that change temperature based on a supplied current. In some embodiments, the servomotors include electrical contacts that transfer small amounts of current to the user fingers in order to create a tingling or sharp sensation.

Moreover, haptic controller 305 precisely targets the haptic feedback at the servomotors or actuators where the user input contacts the data points. For instance, input device 303 may produce separate input from tracking individual finger positions, and may include actuators about each finger. If haptic controller 305 detects that the ring finger makes contact with one or more data points, then haptic controller 305 activates the actuator that is adjacent to the ring finger to provide targeted haptic feedback to the finger that makes contact rather than to all fingers or elsewhere about the user hand. Accordingly, haptic controller 305 maps the haptic feedback actuators of the input device 303 to the inputs that are generated by different sensors of input device 303. Specifically, a haptic glove input device may include a sensor and actuator about each finger of the haptic glove input device. The sensor tracks the finger movement and produces input in the form of coordinates based on the tracked finger movement. The actuator may create directional forces in multiple directions to counter or push back against the finger movement and/or to create different touch sensations associated with temperature, texture, flexibility, motion, etc.

Figure 4:
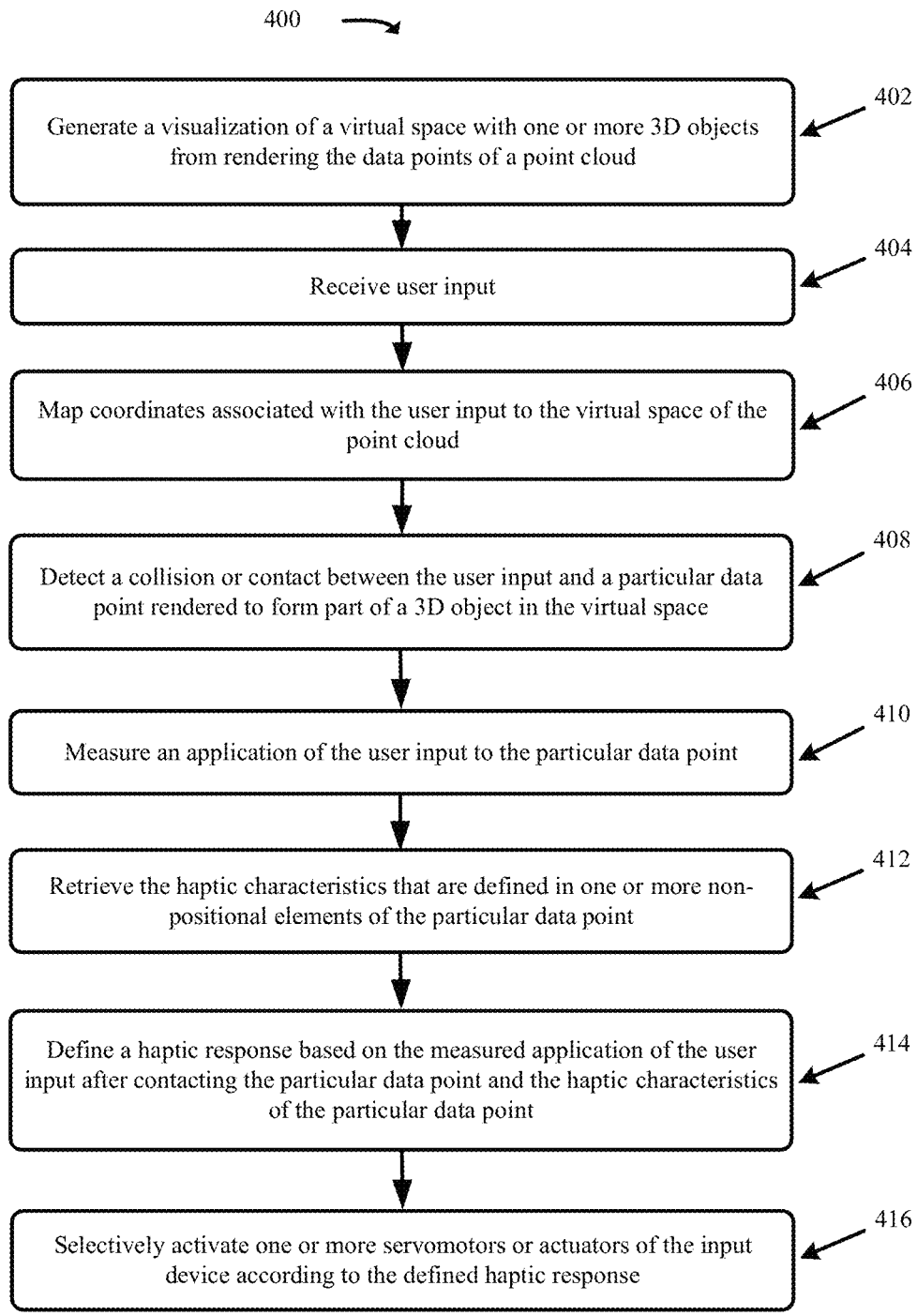
FIG. 4 presents a process for providing precise haptic based on tracked interaction with rendered point cloud data points in accordance with some embodiments presented herein.

FIG. 4 presents a process 400 for providing precise haptic based on tracked interaction with rendered point cloud data points in accordance with some embodiments presented herein. Process 400 is implemented by 3D interactive system 200.

Process 400 includes generating (at 402) a visualization of a virtual space with one or more 3D objects from rendering the data points of a point cloud. The positional elements of the data points define the structure and form of the one or more 3D objects. The non-positional elements of the data points colorize and define the visual characteristics about the structure and form of the one or more 3D objects. The positional and non-positional elements also store the data that 3D interactive system 200 uses for collision detection and the generating the haptic response. For instance, the same positional elements of the data points are compared against user input to detect a collision, and the non-positional elements are defined with haptic characteristics. The haptic characteristics of a data point define the haptic response or sensory feedback that is returned to a user when the user input contacts that data point in the virtual space.

Process 400 includes receiving (at 404) user input. In some embodiments, the user input includes multiple inputs that are simultaneously generated in order to track different hands, fingers, or other multiple points of contact or interactions in the virtual space that the user controls with one or more input devices. For instance, the user input may include first user input associated with a first hand or first finger, and second user input associated with a second hand or second finger.

Process 400 includes mapping (at 406) coordinates associated with the user input to the virtual space of the point cloud. The mapping (at 406) may include converting coordinates generated by the one or more input devices, that track physical movements in the physical space, to corresponding coordinates in the virtual space of the point cloud. Alternatively, the mapping (at 406) may include generating offsets with which to move one or more points of contact in the virtual space based on tracked changes in the user input. For instance, the user input provides measured distances that a particular finger moves in x, y, and z directions, and the mapping (at 406) includes converting those distances to a scaled movement of a virtual finger in the virtual space of the point cloud.

Process 400 includes detecting (at 408) a collision or contact between the user input and a particular data point rendered to form part of a 3D object in the virtual space. Detecting (at 408) the collision includes determining that the mapped coordinates of the user input match or are within a threshold distance of the particular data point position in the virtual space (e.g., values defined for the positional elements of the particular data point). The collision or contact is detected (at 408) based solely on the data defined for the data points and does not involve referencing colliders that are separately defined for the one or more 3D objects presented in the virtual space.

To accelerate the collision detection, 3D interactive system 200 may sort the data points within the rendered field-of-view according to their positional elements (e.g., x, y, and z coordinates), and may perform a lookup of the mapped coordinates of the user input against the sorted positions of the data points to determine if the user input contacts any of the data points. Performance of the lookup may be improved by culling the sorted set of data points to include only the data points that are in one of the same planes as the user input (e.g., x, y, or z plane).

Process 400 include measuring (at 410) an application of the user input to the particular data point. Measuring (at 410) the application of the user input to the particular data point includes measuring the time, force, pressure, direction, and/or movement with which the user input collides or contacts the particular data point. For instance, 3D interactive system 200 tracks the user input after initial contact with the particular data point to determine a distance and direction of the user input after the initial contact (e.g., whether the user input moves past or through the particular data point or is lifted off the particular data point after some measured amount of time). Based on the distance and direction, 3D interactive system 200 may compute a force or pressure measure for the user input contacting the particular data point.

Process 400 include retrieving (at 412) the haptic characteristics that are defined in one or more non-positional elements of the particular data point. The particular data point may be defined with multiple haptic characteristics or may be part of a set of data points that are defined with the same haptic characteristics. In some embodiments, retrieving (at 412) the haptic characteristics may include determining a material property (e.g., wood, plastic, metal, ceramic, etc.) that is defined for the particular data point, and determining the haptic characteristics that are associated with that material property.

Process 400 includes defining (at 414) a haptic response based on the measured (at 410) force, pressure, direction, and/or movements of the user input after contacting the particular data point and the haptic characteristics of the particular data point. For instance, the intensity of the haptic response increases the more force or pressure is placed on the particular data point or in the direction of the particular data point, the longer the contact occurs between the user input and the particular data point, and/or the haptic characteristics indicating the particular data point to be solid, hard, rigid, rough, sharp, inflexible, heavy, hot or cold, or other surface, texture, or material that is associated with increased sensory feedback or resistance. Similarly, the intensity of the haptic response decreases the less force or pressure is placed on the particular data point or in the direction of the particular data point, the shorter the contact between the user input and the particular data point, and the haptic characteristics indicating the particular data point to be hollow, soft, flexible, smooth, blunt, light, temperate, or other surface, texture, or material that is associated with minimal or reduced sensory feedback or resistance.

Defining (at 414) the haptic response includes configuring the amount, intensity, pattern, and/or direction with which to activate one or more servomotors or actuators of the input device. By configuring different amounts, intensities, patterns, and/or directions of activation, the activated servomotors or actuators produce different sensations that recreate the feedback one would get when applying the same touch (e.g., pressure, force, direction, movement, etc.) to a surface or physical object with the same haptic characteristics as the particular data point or the point on the 3D object represented by the particular data point.

Process 400 includes selectively activating (at 416) one or more servomotors or actuators of the input device according to the defined (at 414) haptic response. The selective activation (at 416) includes determining which of the servomotors or actuators on the input device are positioned at or aligned with the one or more input device sensors that generate the user input that resulted in the collision or contact with the particular data point. For instance, the input device may have different sensors that track individual finger movements and that generate different user input for each finger movement. The input device may also have servomotors or actuators aligned with each finger tracking sensor or each user finger such that the selective activation (at 416) includes providing the defined (at 414) haptic response from the servomotors or actuators that are aligned with the one or more fingers producing the user input that contacts the particular data point.

In some embodiments, 3D interactive system 200 stores a mapping between the positions of the input device sensors that generate the different user input and the positions of the servomotors and/or actuators of the input device that provide the haptic feedback to the user. 3D interactive system 200 may adjust the defined (at 414) haptic response to compensate for an offset position between where the contact occurs and where the haptic response can be provided back to the user.

Figure 5:
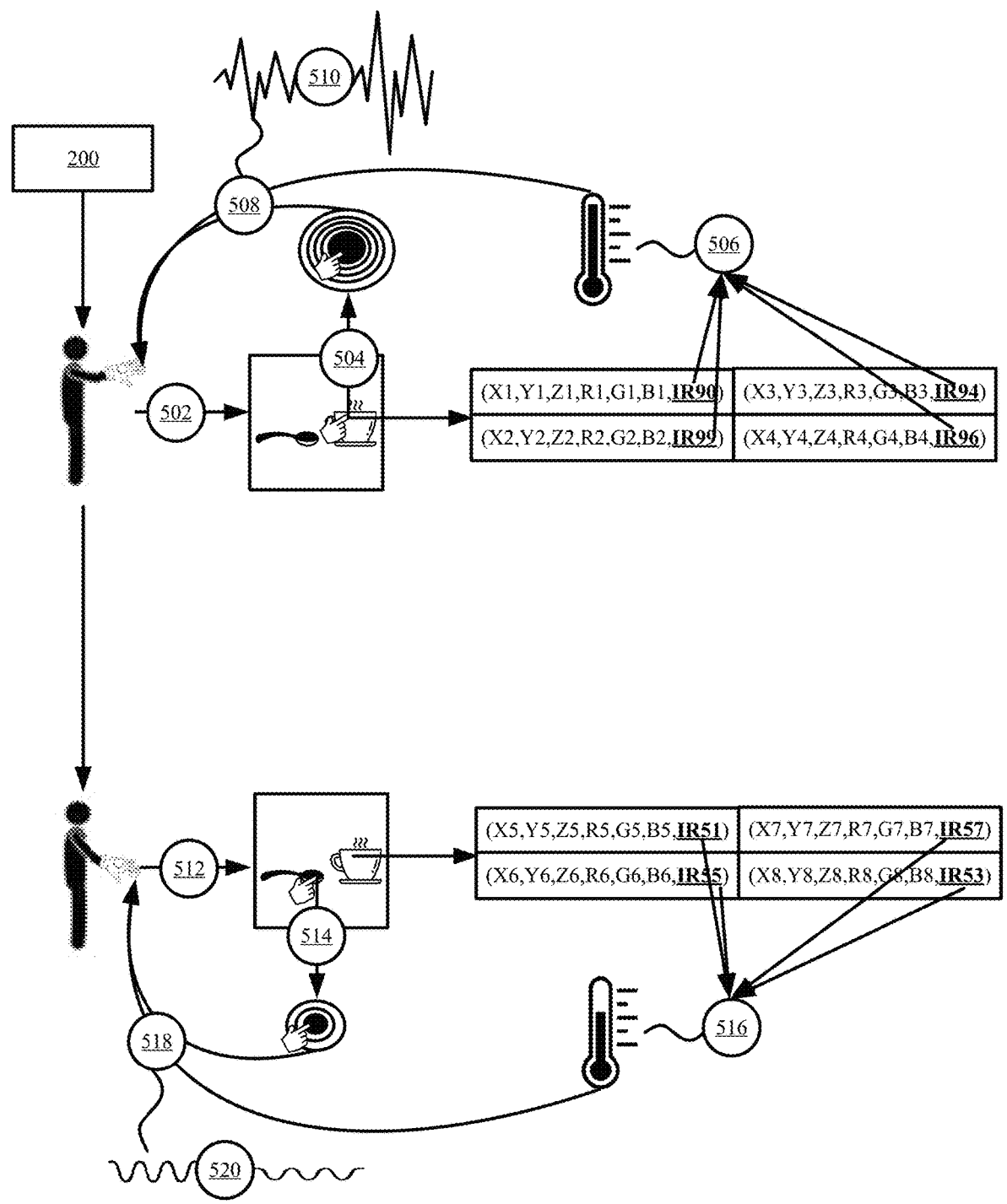
FIG. 5 illustrates an example of providing haptic feedback based on positional data and color values associated with point cloud data points in accordance with some embodiments presented herein.

FIG. 5 illustrates an example of providing haptic feedback based on positional data and color values associated with point cloud data points in accordance with some embodiments presented herein. 3D interactive system 200 detects (at 502) user input that contacts or is within a threshold distance of a first set of data points.

3D interactive system 200 measures (at 504) the application of the user input on the first set of data points. For instance, 3D interactive system 200 measures (at 504) the force, pressure, distance, movement, and/or duration with which the user input is applied to the first set of data points.

3D interactive system 200 derives (at 506) a first temperature associated with the first set of data points based on hyperspectral values that are captured from the surfaces or object represented by the first set of data points. The hyperspectral values correspond to infrared measurements of the surfaces represented by the first set of data points, and represent a very hot surface.

3D interactive system 200 provides (at 508) a first haptic response that simulates the heat associated with the first temperature, and increases (at 510) the first haptic response in response to the measured (at 504) application of the user input increasing in duration and/or force. 3D interactive system 200 targets the first haptic response to the actuators on the input device that are aligned with the one or more user fingers used to generate the user input.

3D interactive system 200 detects (at 512) the user input moving off the first set of data points over to a second set of data points. 3D interactive system 200 measures (at 514) the application of the user input on the second set of data points, and derives (at 516) a second temperature associated with the second set of data points based on the different hyperspectral values that are captured from the surfaces or object represented by the second set of data points. The hyperspectral values of the second set of data points correspond to a temperate surface that is neither hot nor cold.

3D interactive system 200 adjusts the haptic response in response to the user input moving to the second set of data points, and provides (at 518) a second haptic response that simulates the temperate or mild temperature while the second user input remains in contact with the second set of data points. 3D interactive system 200 decreases (at 520) the second haptic response in response to measuring the user input applying less force or having less contact with the second set of data points. Decreasing (at 520) the second haptic response includes reducing the sensory feedback or intensity of the sensory feedback used to simulate the mild temperature to simulate the actual reduced feeling that a human receives when having less contact with a temperate surface.

Figure 6:
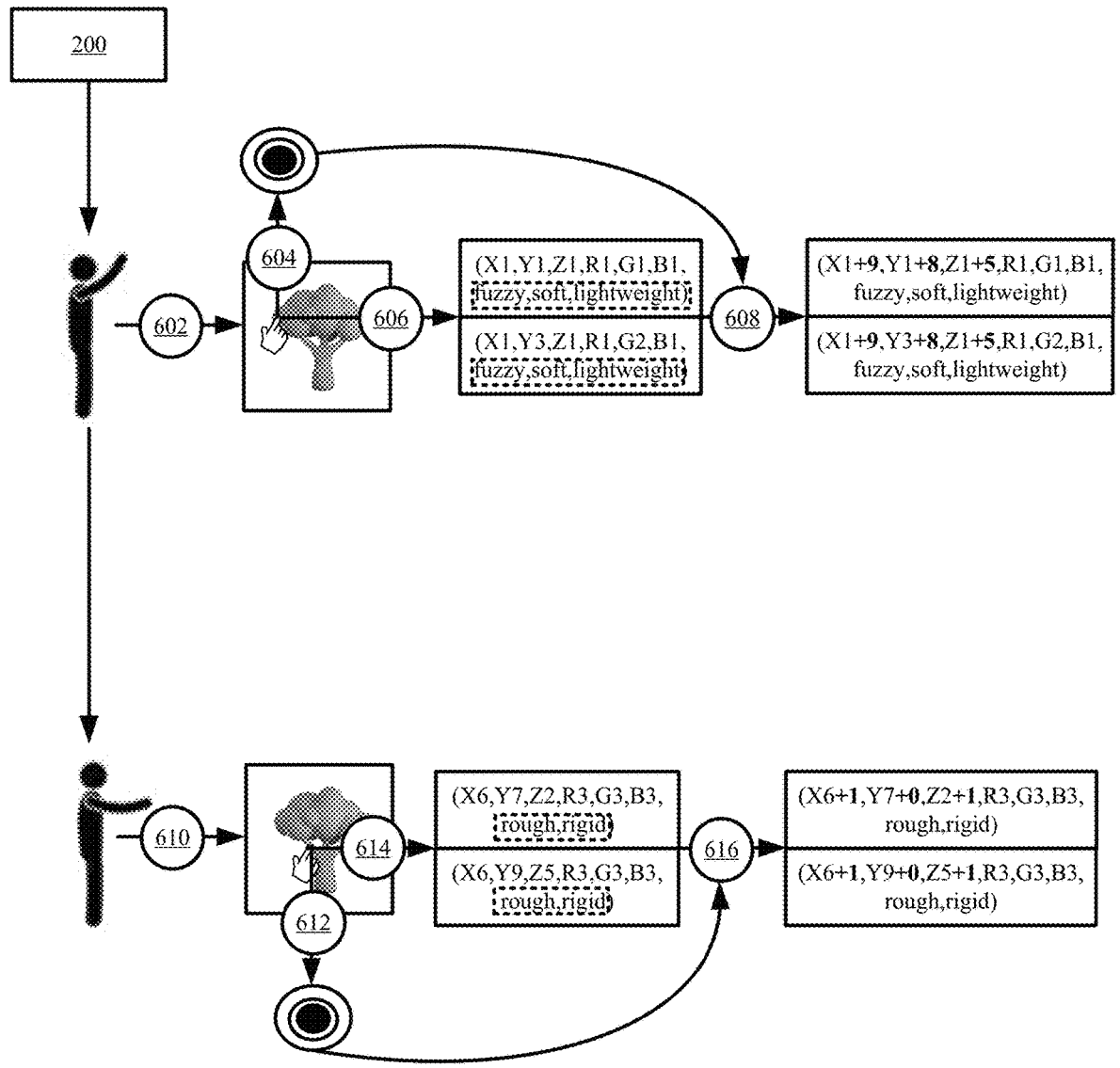
FIG. 6 illustrates an example of adjusting a 3D visualization based on measured user input and haptic characteristics associated with the contacted data points of the 3D visualization in accordance with some embodiments presented herein.

In some embodiments, 3D interactive system 200 adjusts the visualization of the 3D objects presented in UI 301 or the rendered virtual space based on the measured application of the user input on data points that represent or form the 3D objects, and further based on the haptic characteristics of the data points. FIG. 6 illustrates an example of adjusting a 3D visualization based on measured user input and haptic characteristics associated with the contacted data points of the 3D visualization in accordance with some embodiments presented herein.

3D interactive system 200 detects (at 602) user input that touches a first set of data points, and measures (at 604) a particular force that is applied by the user input on the first set of data points. 3D interactive system 200 determines (at 606) the haptic characteristics of the first set of data points, and displaces (at 608) the first set of data points by a first amount or distance that is calculated based on the measured (at 604) application of the particular force and the haptic characteristics of the first set data points. For instance, if the haptic characteristics indicate that the first set of data points are heavy, rigid, or hard, then a greater amount of measured force is required to displace the first set of data points by a particular distance than if the haptic characteristics indicate that the first set of data points are light, flexible, or soft.

3D interactive system 200 detects (at 610) the user input moving until contact is made with a second set of data points. 3D interactive system 200 measures (at 612) the same particular force being applied by the user input on the second set of data points. 3D interactive system 200 determines (at 614) that the second set of data points are associated with different haptic characteristics than the first set of data points. Specifically, the haptic characteristics of the second set of data points indicate rough and rigid characteristics of the wooden branch represented by the second set of data points, whereas the haptic characteristics of the first set of data points indicate fuzzy, soft, and lightweight characteristics of a leaf represented by the first set of data points.

3D interactive system 200 displaces (at 616) the second set of data points by a different second amount or distance even though the same particular force is applied to the first and second sets of data points. The different haptic characteristics of the second set data points alter how the particular force impacts the positioning of the second set of data points.

Figure 7:
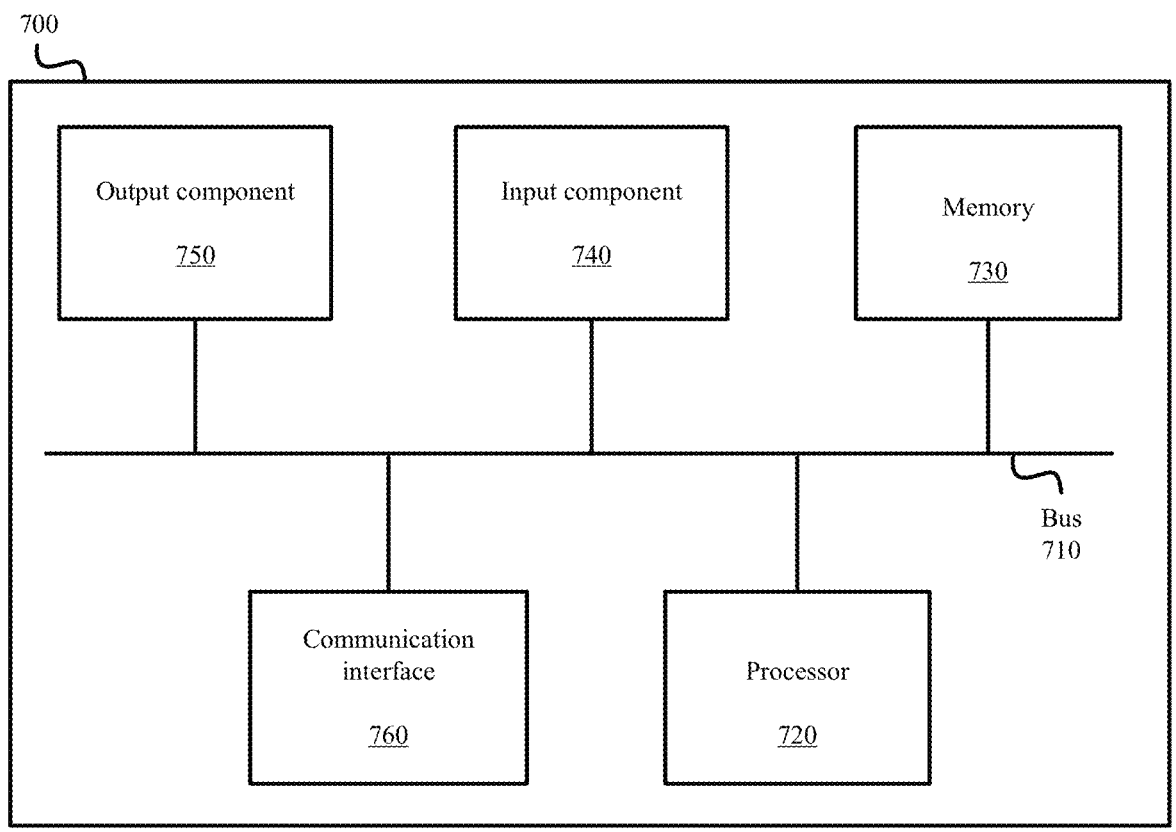
FIG. 7 illustrates example components of one or more devices, according to one or more embodiments described herein.

FIG. 7 is a diagram of example components of device 700. Device 700 may be used to implement one or more of the devices or systems described above (e.g., 3D interactive system 200, input device 303, haptic controller 305, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   presenting an object in a virtual space that is formed from a plurality of data points distributed in the virtual space, each particular data point of the plurality of data points being defined with (i) a different position in the virtual space that corresponds to a different point about a surface of the object, (ii) visual characteristics that correspond to colors that are presented at the different position of the particular data point, and (iii) one or more haptic characteristics for an intensity of a haptic response provided at the different position of the particular data point in response to a virtual interaction with the different point about the surface represented by that particular data point, wherein the one or more haptic characteristics of the particular data point are different values than the colors and the visual characteristics of the particular data point, and wherein the one or more haptic characteristic are associated with the particular data point of the object and are not fixed to one or more pixels of a display presenting the object;
   receiving a user input from a haptic input device comprising a plurality of actuators that are distributed across the haptic input device, wherein the haptic input device is decoupled from the display;
   determining that the user input is applied at different positions in a physical space that map to the different position of a first data point and the different position of a second data point of the plurality of data points in the virtual space, wherein the user input does not contact the display;
   retrieving the one or more haptic characteristics of the first data point and of the second data point;
   generating a first haptic response by selectively activating a first actuator of the haptic input device with a position in the physical space that does not contact the display and that maps to the different position of the first data point of the object in the virtual space and by generating the first haptic response according to the one or more haptic characteristics of the first data point; and
   generating a second haptic response by selectively activating a second actuator of the haptic input device with a position in the physical space that does not contact the display and that maps to the different position of the second data point of the object in the virtual space and by generating the second haptic response according to the one or more haptic characteristics of the second data point, wherein the first haptic response is different than the second haptic response based on different values defined for the one or more haptic characteristics of the first data point and the one or more haptic characteristics of the second data point.

2. The method of claim 1 further comprising:
detecting that the user input moves in the physical space from contacting the first data point to contacting a third data point of the plurality of data points in the virtual space with a same amount of force, pressure, or movement;
determining that the one or more haptic characteristics of the third data point differ from the one or more haptic characteristics of the first data point; and
adjusting the haptic response provided by the first actuator based on a difference between the one or more haptic characteristics of the third data point and the one or more haptic characteristics of the first data point and the user input being applied to the third data point with the same force, pressure, or movement as the application of the user input on the first data point.

3. The method of claim 1 further comprising:
mapping the user input from tracked positions in the physical space to positions in the virtual space.

4. The method of claim 1, wherein receiving the user input comprises:
receiving a first input that tracks movements of a first finger associated with the first actuator; and
receiving a second input that tracks movements of a second finger associated with the second actuator.

5. The method of claim 4, wherein determining that the user input is applied at the different positions comprises:
determining that the second input contacts the second data point and that the first input contacts the first data point.

6. The method of claim 1 further comprising:
defining the first haptic response by converting a force, pressure, time measurement, or movement with which the user input is applied in the physical space to a first haptic feedback value, and by increasing or decreasing the first haptic feedback value according to the one or more haptic characteristics of the first data point.

7. The method of claim 1 further comprising:
determining one or more of a force, pressure, time measurement, distance, movement, or duration with which the user input is applied in the physical space; and
defining the first haptic response based on the one or more haptic characteristics of the first data point as adjusted by the one or more of the force, pressure, time measurement, distance, movement, or duration with which the user input is applied in the physical space.

8. The method of claim 1, wherein generating the first haptic response comprises:
increasing an intensity of the first haptic response in response to the one or more haptic characteristics of the first data point having a first set of values and the user input being applied in the physical space with a particular force, pressure, time measurement, or duration; and
decreasing the intensity of the first haptic response in response to the one or more haptic characteristics of the first data point having a second set of values and the user input being applied in the physical space with the particular force, pressure, time measurement, or duration.

9. The method of claim 1, wherein generating the first haptic response comprises:
defining a set of haptic activations for the first actuator that simulate a texture represented by the one or more haptic characteristics of the first data point.

10. The method of claim 1,
wherein the one or more haptic characteristics of the first data point correspond to hyperspectral measurements that are obtained from the different point about the surface represented by the first data point.

11. The method of claim 10, wherein generating the first haptic response comprises:
converting the hyperspectral measurements to a temperature; and
defining a set of haptic activations that simulate the temperature on the first actuator.

12. A system comprising:
one or more hardware processors configured to:
present an object in a virtual space that is formed from a plurality of data points distributed in the virtual space, each particular data point of the plurality of data points being defined with (i) a different position in the virtual space that corresponds to a different point about a surface of the object, (ii) visual characteristics that correspond to colors that are presented at the different position of the particular data point, and (iii) one or more haptic characteristics for an intensity of a haptic response provided at the different position of the particular data point in response to a virtual interaction with the different point about the surface represented by that particular data point, wherein the one or more haptic characteristics of the particular data point are different values than the colors and the visual characteristics of the particular data point, and wherein the one or more haptic characteristic are associated with the particular data point of the object and are not fixed to one or more pixels of a display presenting the object;
receive a user input from a haptic input device comprising a plurality of actuators that are distributed across the haptic input device, wherein the haptic input device is decoupled from the display;
determine that the user input is applied at different positions in a physical space that map to the different position of a first data point and the different position of a second data point of the plurality of data points in the virtual space, wherein the user input does not contact the display;
retrieve the one or more haptic characteristics of the first data point and of the second data point;
generate a first haptic response by selectively activating a first actuator of the haptic input device with a position in the physical space that does not contact the display and that maps to the different position of the first data point of the object in the virtual space and by generating the first haptic response according to the one or more haptic characteristics of the first data point; and
generate a second haptic response by selectively activating a second actuator of the haptic input device with a position in the physical space that does not contact the display and that maps to the different position of the second data point of the object in the virtual space and by generating the second haptic response according to the one or more haptic characteristics of the second data point, wherein the first haptic response is different than the second haptic response based on different values defined for the one or more haptic characteristics of the first data point and the one or more haptic characteristics of the second data point.

13. The system of claim 12, wherein the one or more hardware processors are further configured to:
- detect that the user input moves in the physical space from contacting the first data point to contacting a third data point of the plurality of data points in the virtual space with a same amount of force, pressure, or movement;
- determine that the one or more haptic characteristics of the third data point differ from the one or more haptic characteristics of the first data point; and
- adjust the haptic response provided by the first actuator based on a difference between the one or more haptic characteristics of the third data point and the one or more haptic characteristics of the first data point and the user input being applied to the third data point with the same force, pressure, or movement as the application of the user input on the first data point.

14. The system of claim 12, wherein the one or more hardware processors are further configured to:
- map the user input from tracked positions in the physical space to positions in the virtual space.

15. The system of claim 12, wherein receiving the user input comprises:
- receiving a first input that tracks movements of a first finger associated with the first actuator; and
- receiving a second input that tracks movements of a second finger associated with the second actuator.

16. The system of claim 15, wherein determining that the user input is applied at the different positions comprises:
- determining that the second input contacts the second data point and that the first input contacts the first data point.

17. A non-transitory computer-readable medium storing program instructions that, when executed by one or more hardware processors of a three-dimensional ("3D") interactive system, cause the 3D interactive system to perform operations comprising:
- presenting an object in a virtual space that is formed from a plurality of data points distributed in the virtual space, each particular data point of the plurality of data points being defined with (i) a different position in the virtual space that corresponds to a different point about a surface of the object, (ii) visual characteristics that correspond to colors that are presented at the different position of the particular data point, and (iii) one or more haptic characteristics for an intensity of a haptic response provided at the different position of the particular data point in response to a virtual interaction with the different point about the surface represented by that particular data point, wherein the one or more haptic characteristics of the particular data point are different values than the colors and the visual characteristics of the particular data point, and wherein the one or more haptic characteristic are associated with the particular data point of the object and are not fixed to one or more pixels of a display presenting the object;
- receiving a user input from a haptic input device comprising a plurality of actuators that are distributed across the haptic input device, wherein the haptic input device is decoupled from the display;
- determining that the user input is applied at different positions in a physical space that map to the different position of a first data point and the different position of a second data point of the plurality of data points in the virtual space, wherein the user input does not contact the display;
- retrieving the one or more haptic characteristics of the first data point and of the second data point;
- generating a first haptic response by selectively activating a first actuator of the haptic input device with a position in the physical space that does not contact the display and that maps to the different position of the first data point of the object in the virtual space and by generating the first haptic response according to the one or more haptic characteristics of the first data point; and
- generating a second haptic response by selectively activating a second actuator of the haptic input device with a position in the physical space that does not contact the display and that maps to the different position of the second data point of the object in the virtual space and by generating the second haptic response according to the one or more haptic characteristics of the second data point, wherein the first haptic response is different than the second haptic response based on different values defined for the one or more haptic characteristics of the first data point and the one or more haptic characteristics of the second data point.

18. The method of claim 1 further comprising:
- measuring a common value with which the user input is applied at the different positions in the physical space that map to the different positions of the first data point and the second data point in the virtual space, wherein the common value corresponds to a force, pressure, distance, or duration measurement;
- defining an intensity for the first haptic response and the second haptic response based on the common value; and
- modifying the intensity for the first haptic response differently than the intensity for the second haptic response based on the different values defined for the one or more haptic characteristics of the first data point and the one or more haptic characteristics of the second data point.

* * * * *